United States Patent
Lamberts et al.

(10) Patent No.: US 6,426,843 B1
(45) Date of Patent: Jul. 30, 2002

(54) SETTLE TIME ESTIMATOR FEEDBACK FOR ROTATIONAL POSITION REORDERING IN DATA STORAGE DEVICES

(75) Inventors: Bernd Lamberts, Cupertino; Louis Joseph Serrano; Mantle Man-Hon Yu, both of San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/300,070

(22) Filed: Apr. 27, 1999

(51) Int. Cl.[7] ............................................. G11B 21/02
(52) U.S. Cl. ...................................................... 360/75
(58) Field of Search ................................. 360/75, 77.04, 360/78.09, 77.02, 78.04, 78.07; 711/100, 111, 4; 710/5, 6, 7, 263

(56) References Cited

U.S. PATENT DOCUMENTS

| | | | |
|---|---|---|---|
| 5,062,023 A | | 10/1991 | Squire ...................... 360/78.04 |
| 5,089,999 A | | 2/1992 | Ishida et al. ................... 369/32 |
| 5,126,897 A | | 6/1992 | Ogawa et al. ............ 360/78.09 |
| 5,333,083 A | | 7/1994 | Nakano .................... 360/77.04 |
| 5,381,282 A | * | 1/1995 | Arai et al. ................ 360/78.09 |
| 5,691,617 A | * | 11/1997 | Funches .............. 360/78.04 X |
| 5,867,342 A | * | 2/1999 | Hattori ..................... 360/77.04 |
| 6,101,065 A | * | 8/2000 | Alfred et al. ............. 360/78.04 |
| 6,166,876 A | * | 12/2000 | Liu ...................... 360/78.09 X |

* cited by examiner

Primary Examiner—David Hudspeth
Assistant Examiner—K. Wong
(74) Attorney, Agent, or Firm—Gates & Cooper LLP

(57) ABSTRACT

A method, apparatus, and article of manufacture for rotational position reordering of queued commands in a data storage device based on settle time estimator feedback. An initial settle time estimation is programmed into a servo controller for the data storage device. As data operations are performed in the data storage device, an actual settle time is measured for the data operations, generally through the use of a timer in the servo controller. The settle time estimation is then modified based on the actual settle time and the data operations are reordered or scheduled based on the settle time estimation. Specifically, the settle time estimation is adjusted based on a success rate for the data operations, wherein the success rate comprises a comparison of the actual settle time versus the settle time estimation. A first delta value is subtracted from the settle time estimation when the settle time estimation is greater than the actual settle time, and a second delta value is added to the settle time estimation when the settle time estimation is less than the actual settle time. Different settle time estimations may be used depending on various characteristics, i.e., settle time estimations differ for different transducers in the data storage device, according to a type of seek operation, according to a seek direction, according to a track location, and according to seek length.

23 Claims, 2 Drawing Sheets

SETTLE TIME ESTIMATOR FEEDBACK FOR ROTATIONAL POSITION REORDERING IN DATA STORAGE DEVICES

BACKGROUND OF THE INVENTION

1. Field of the Invention

The present invention relates generally to servo control systems used for positioning read/write transducers in data storage devices, and more particularly, to a method, apparatus, and article of manufacture for providing settle time estimator feedback for use in rotational position reordering of queued commands in the data storage device.

2. Description of Related Art

It is well known in the art to store data on magnetic or optical disk drives. Data is stored on a disk drive on one or more tracks of predetermined format disposed on a disk-shaped recording media. The data is written to and read from the tracks using one or more transducers, which typically comprise read/write heads. Reading data from a desired one of the tracks on the disk surfaces requires knowledge of the read/write head position relative to the track as the disk rotates and the head is moved across the disk, and requires precise centering of the head over the disk track. Conventionally, the read/write head is mounted on a head positioning assembly and a servo controller controls movement of the head positioning assembly across the disk surface to move the read/write head from track to track (track seeking) and, once over a selected track, to maintain the read/write head in a path over the centerline of the track (track following).

The data storage device may queue multiple commands and also may reorder or schedule the commands within the queue in order to reduce overall access times. For example, it is well known to schedule the execution of queued commands to minimize cylinder distances between commands. More advanced scheduling methods will take into account both a radial location (i.e., a track number) as well as a circumferential location (i.e., a sector number) when choosing the next command to execute.

However, these scheduling methods need to have an accurate estimate of how long it will take to move the head (i.e., until a desired operation can be reliably repeated) or the target sector may be missed. That is, a command may be scheduled for execution that does not complete until shortly after the target sector has passed under the head; this may entail waiting for one or more full revolutions of the disks for the target sector to again pass under the head (i.e., a "missed" revolution). In fact, as the time required to move the heads decreases relative to the rotational speed of the disks, these missed revolutions have an even greater impact on the overall performance of the device.

One current technique to overcome this problem is to estimate a mean time required to move the heads and then add a "fudge factor" (i.e., a settle time estimation) to the mean time estimate in an attempt to minimize the number of missed revolutions. The larger this settle time estimation, the fewer missed revolutions. However, a large settle time estimation can also have a negative impact on performance of the drives, because slower seeks will be selected by the scheduling methods.

One constraint in specifying a settle time estimation is that, typically, it is specified once for all drives (although a different settle time estimation may be specified for reads and writes). However, while the mean move time is constantly updated, this settle time estimation is usually not modified, and thus a conservative settle time estimation is often specified. This lack of modification for the settle time estimation reduces performance of the drives. Thus, there is a need in the art for improved techniques for providing settle time estimations that can be used in reordering queued commands in order to improve the operation of disk drives.

SUMMARY OF THE INVENTION

To minimize the limitations in the prior art described above, and to minimize other limitations that will become apparent upon reading and understanding the present specification, the present invention discloses a method, apparatus, and article of manufacture for rotational position reordering of queued commands in a data storage device based on settle time estimator feedback. An initial settle time estimation is programmed into a servo controller for the data storage device. As data operations are performed in the data storage device, an actual settle time is measured for the data operations, generally through the use of a timer in the servo controller. The settle time estimation is then modified based on the actual settle time and the data operations are reordered or scheduled based on the settle time estimation. Specifically, the settle time estimation is adjusted based on a success rate for the data operations, wherein the success rate comprises a comparison of the actual settle time versus the settle time estimation. A first delta value is subtracted from the settle time estimation when the settle time estimation is greater than the actual settle time, and a second delta value is added to the settle time estimation when the settle time estimation is less than the actual settle time. Different settle time estimations may be used depending on various characteristics, i.e., settle time estimations differ for different transducers in the data storage device, according to a type of seek operation, according to a seek direction, according to a track location, and according to a general range of seek lengths.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Disk Drive Components

Figure 1:
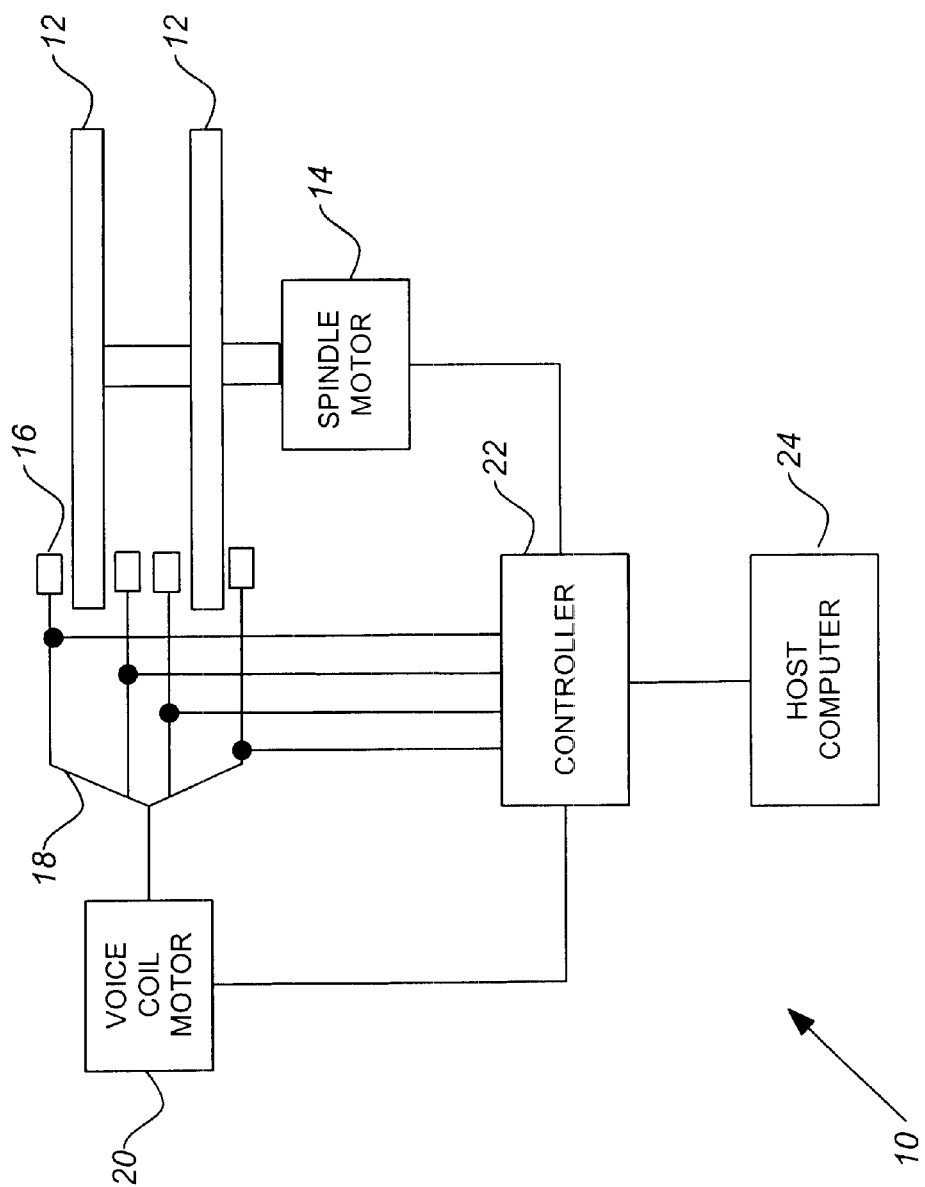
FIG. 1 is an illustration of an exemplary disk drive according to the preferred embodiment of the present invention.

FIG. 1 is a block diagram of an exemplary disk drive 10 according to the preferred embodiment of the present invention. Those skilled in the art will recognize that the exemplary components and structure illustrated in FIG. 1 are not intended to limit the present invention. Indeed, those skilled in the art will recognize that other alternative embodiments may be used without departing from the scope of the present invention.

The disk drive 10 stores information on the surfaces of one or more stacked disks 12 in the form of transitions or patterns formed on one or more data tracks. The disks 12 are rotatably mounted on a spindle motor 14. Transitions are sensed or "read" from the disk 12 surfaces via one or more transducers 16, known as read/write heads, supported in close proximity to the disk 12 surfaces by a head positioning assembly 18, wherein the transducers 16 convert the transitions into electrical signals. The head positioning assembly 18 positions the transducers 16 over the disk 12 surfaces in a linear or rotary manner by operation of a voice coil motor (VCM) 20, which is controlled by a servo controller 22.

Data is organized on the disks 12 using a series of concentric, radially spaced tracks, wherein a "cylinder" comprises a stack of these tracks across multiple disk 12 surfaces. Each track is divided into a plurality of sectors formatted in a predetermined, standard manner. The format specifies the sequence and location of certain types of information such as track number, sector number, data field, etc. A number of different formats may be used for the tracks.

When a read/write command is issued by a host computer 24, the controller 22 converts logical addresses into their respective physical addresses, i.e., cylinder, read/write head 16, and sector, and then proceeds to read from and/or write to the data at the physical addresses by moving the read/write heads 16 to the corresponding position on the disk 12 surfaces. The controller 22 essentially provides two functions: track seeking and track following. Ideally, a track seeking function should be able to move the heads 16 between two tracks in the minimum possible time, while the track following function should maintain the heads 16 at the centerline of a track being followed.

A third, transitional mode, known as track settle, covers the situation where the track seeking function has completed, and the track following function has been initiated, but the heads 16 have yet to stabilize at the centerline of the target track 16. Generally, the settle time is defined as the time period required to reliably move the head 16 from a track located immediately before the target track to the centerline of the target track. Another way to define settle time is the time period from the completion of the move of the head 16 until a desired operation can be reliably repeated. In this sense, read and write operations will have different settle times. Moreover, read and write operations will fail after the move has completed if the head 16 subsequently moves too far from the centerline of the target track. Generally, the settle time is the amount of time required after completion of the move of the heads 16 to prevent read and write operations from failing.

One difficulty in characterizing the settle time is that the statistical distribution of settle times is not only non-Gaussian, but time varying as well. That is, to accurately decide upon a "typical" settle time may be difficult using just a mean and sigma of a population of settle times. Worse, the statistical distribution of settle times can be different for different heads 16, for different seek directions, for different target tracks, and for different seek lengths.

Moreover, certain forces (mechanical bias, external vibrations, vibrations induced in the mechanical structure by seeking, air currents, etc.) can cause the heads 16 to move off of the target track centerline. These forces may change the settle time dynamically during operation, and thus it is necessary to provide a mechanism for measuring such changes in the settle time. Through such measurements, the servo controller 22 can predict the settle time for subsequent track seeking and following functions. Moreover, a scheduling/reordering method can use this predicted settle time to perform rotational position reordering in the scheduling of queued commands.

Rotational Position Reordering

As mentioned above, the reordering or scheduling of queued commands by a disk drive is known in the art. A number of commands may be queued before being executed against the disk drive 10. The commands can then be reordered or scheduled within the queue in an attempt to reduce overall access times. The present invention introduces the concept of updating settle time estimations for use in reordering queued commands based upon the "hit and miss" rate of the desired data operation. The settle time estimations comprise a "fudge factor" that are used in addition to mean seek and settle times monitored by a servo controller 22. The settle time estimations provide a certain robustness against the variation in the settle times that normally occur during the operation of the drive 10.

When queued commands are reordered, a prediction of the performance of the servo controller 22 fundamentally determines the efficiency of such reorderings. Thus, a considerable amount of development time is spent in an attempt to model the performance of the servo controller 22 accurately. Such models, however, cannot substitute for actual performance measurements, especially with regard to the variances encountered between individual disk drives 10.

Currently, the actual seek and settle times are monitored by the servo controller 22 for use in scheduling and/or reordering queued commands. However, to account for the distribution of actual seek and settle times, a fixed value representing the actual seek and settle times is typically used by the servo controller 22.

The preferred embodiment of the present invention, on the other hand, can provide more optimal rotational position reorderings of queued commands by constantly assessing the actual success rates of executed commands and adjusting the settle time estimations in response thereto. Of course, the monitoring of success rates for commands can be performed using direct feedback, which is accomplished using the servo controller 22 loop. It can also be performed via the command scheduling/reordering method itself, if the method has access to the completion times for the commands.

In a preferred embodiment, the servo controller 22 may be pre-programmed (during manufacturing, field engineering, etc.), with initial settle time estimations for each of a plurality of classifications (i.e., for different read/write heads, according to a type of seek operation, for read versus write operations, according to a seek direction, according to a track location, etc.). The actual settle time is then measured by the servo controller 22, using a timer for example, and the actual settle time is then compared against the previous (including initial) settle time estimation in order to determine whether the settle time estimation should be modified.

If the measured settle time is less than the previous (including initial) settle time estimation, a first delta value is subtracted from the settle time estimation to provide a new settle time estimation; otherwise, if the measured settle time is greater than the previous (including initial) settle time estimation, a second delta value is added to provide a new settle time estimation. In one embodiment, the first and second delta values are different, so that the overall success rate of the scheduling/reordering method can be controlled; other embodiments may use identical delta values.

For example, if a first delta value of zero is subtracted for success, then the settle time estimate will grow monotonically until it is large enough that no revolutions are missed. In contrast, if the first and second delta values are equal, then the missed revolution rate will tend to be 50% on average.

Beginning from an initial settle time estimation that is larger than expected, the servo controller 22 generally would continuously reduce the settle time estimation until it observes an underestimation of the settle time. In the preferred embodiment, this also includes the fundamental idea that an underestimation of the settle time can simply be treated as missed revolutions of the disks 12. Thus, the following simple equation can be used:

$$1/(\text{error rate delta}) \times \text{revolution time} < \text{settle time estimation delta}$$

The error rate delta is the difference between the number of revolutions missed due to slow settle times at one settle time estimate and a second settle time estimate value. If the improvement in the settle time estimation delta is larger than the time lost due to missed revolutions, then the overall operation is improved by using the smaller settle time estimation delta.

If the settle time is underestimated, then the target sector will be missed, thereby requiring extra revolutions of the disks 12 to access the target sector. If the settle time is overestimated, then the performance of the scheduling/reordering method for commands is sub-optimal.

Moreover, the above equation leads to the realization that, so long as the additional time due to missed revolutions per command is smaller then the reduced settle time estimation, overall performance can be improved. This argument is based on the fact that the starting points (starting sectors) of queued commands are randomly distributed, and thus statistically the servo controller 22 will be able to take advantage of a reduced settle time estimations in a linear fashion.

It is expected that, using the present invention, the settle time estimation would eventually achieve a steady state. The steady state settle time estimation would provide the most accurate rotational position reordering of queued commands and thus the fastest possible overall access time in this regard.

A simple way to implement the present invention is to use a timer in the servo controller 22 to monitor the settle time from initiation of track following mode until the read/write head 16 becomes centered on the target track and ready to execute the command. The timer can be set so that expirations are counted as missed revolutions of the disks 12. In this way, the throughput performance can be easily obtained.

The robustness of the present invention is superior as compared to the prior art, while its implementation is simpler and more general. Furthermore, the present invention takes non-linear behavior, such as settle time overshoots and other arrival phenomena, into account, whereas the prior art treats such behavior only as a "fudge factor". A further advantage of the present invention is that it allows the servo controller 22 to ship using a "hard-coded" initial estimation of the settle time, while guaranteeing an optimal adjusted estimation of the settle time based on actual operating conditions.

Yet another advantage of the invention is that different classes of seeks can have different settle time estimates. A class in this case can be determined by direction of seek, approximate location, head number, seek length, etc. So for example, on a drive with ten heads, the surface could be subdivided into multiple zones for the classification of seeks, and seeks could also be separately categorized by direction, by read or write, etc. This will result in a large number of different settle time estimates.

Logic of the Preferred Embodiment

Figure 2:
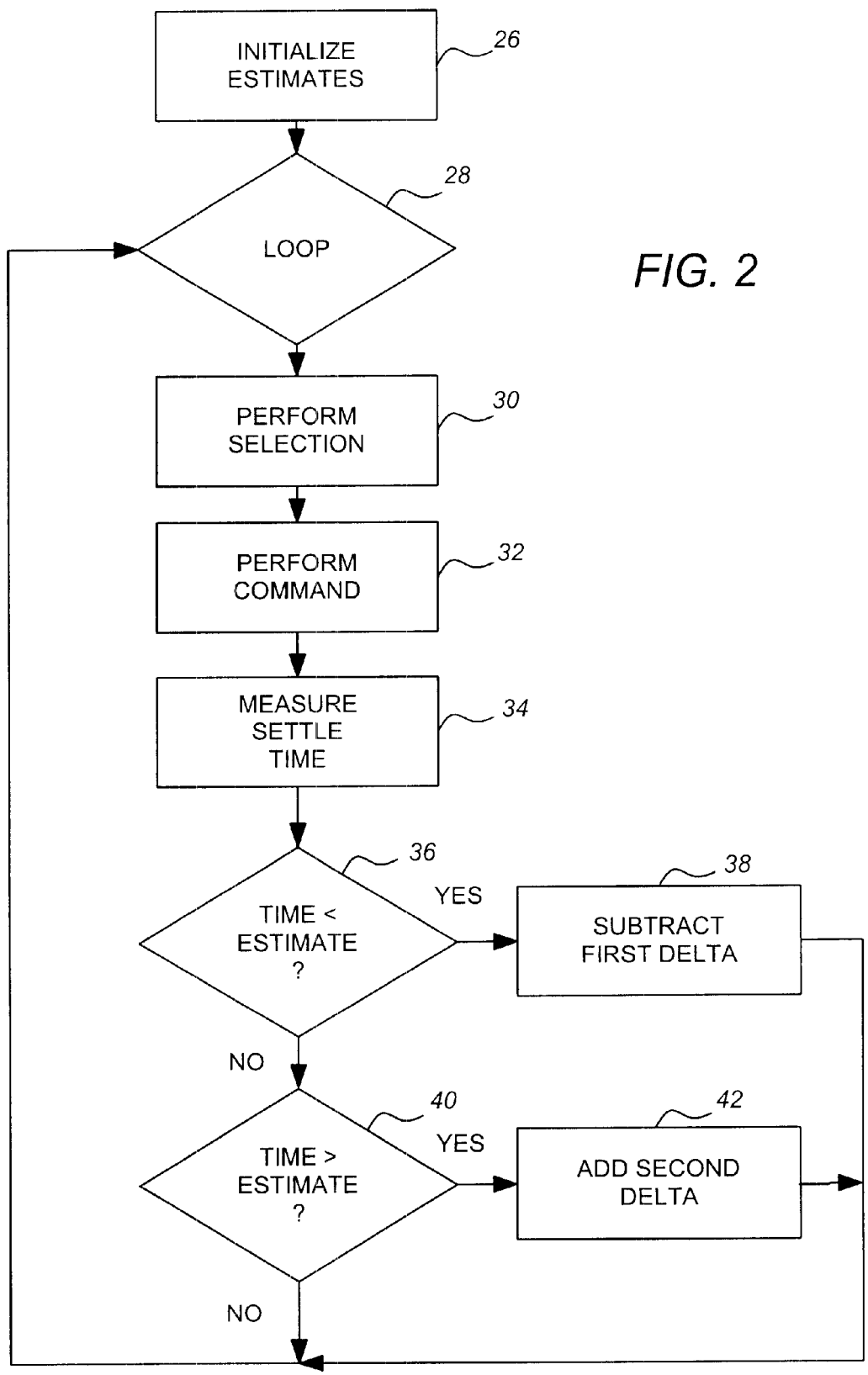
FIG. 2 is a flow chart illustrating the logic performed according to the preferred embodiment of the present invention.

FIG. 2 is a flow chart illustrating the logic performed according to the preferred embodiment of the present invention.

Block 26 represents the controller 22 (optionally) initializing one or more settle time estimations for use in reordering or scheduling of queued commands.

Block 28 represents the controller 22 looping through the queued commands.

Block 30 represents the controller 22 selecting the next command to perform.

Block 32 represents the controller 22 performing the selected command.

Block 34 represents the controller 22 measuring the actual settle time for the command.

Block 36 is a decision block that determines whether the measured actual settle time is less than the previous settle time estimation. If so, control transfers to block 38; otherwise, control transfers to Block 40.

Block 38 represents the controller 22 subtracting a first delta value from the settle time estimation. Thereafter, control transfers to Block 28.

Block 40 is a decision block that determines whether the measured actual settle time is greater than the previous settle time estimation. If so, control transfers to block 42; otherwise, control transfers to Block 28.

Block 42 represents the controller 22 adding a second delta value to the settle time estimation. Thereafter, control transfers to Block 28.

CONCLUSION

This concludes the description of the preferred embodiment of the present invention. Generally, preferred embodiment of the present invention is implemented as programming within the servo controller, an interface processor, or as logic embodied in some other electronics of the data storage device. This programming comprises instructions and/or data that is embodied in or retrievable from a device, medium, or carrier. Moreover, these instructions and/or data, when read, executed, and/or interpreted, perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture", or alternatively, "computer program carrier", as used herein is intended to encompass logic or instructions embodied in or accessible from any device, carrier, or media.

Of course, those skilled in the art will recognize many modifications may be made to this implementation without departing from the scope of the present invention. Indeed, those skilled in the art will recognize that any combination of the above components, or any number of different components, including programmable or non-programmable devices and circuits, may be used to implement the present invention, so long as similar functions are performed thereby.

In addition, the present invention can be applied to any number of different data storage devices. For example, any type of rotating data storage device, such as a magnetic, optical, or other device, could benefit from the present invention. Moreover, different electronics or logic could be used to implement the present invention.

In conclusion, the present invention discloses a method, apparatus, and article of manufacture for rotational position reordering of queued commands in a data storage device based on settle time estimator feedback. An initial settle time estimation is programmed into a servo controller for the data storage device. As data operations are performed in the data storage device, an actual settle time is measured for the data operations, generally through the use of a timer in the servo controller. The settle time estimation is then modified based on the actual settle time and the data operations are reordered or scheduled based on the settle time estimation. Specifically, the settle time estimation is adjusted based on a success rate for the data operations, wherein the success rate comprises a comparison of the actual settle time versus the settle time estimation. A first delta value is subtracted from the settle time estimation when the settle time estimation is greater than the actual settle time, and a second delta value is added to the settle time estimation when the settle time estimation is less than the actual settle time. Different settle time estimations may be used depending on various characteristics, i.e., settle time estimations differ for different transducers in the data storage device, according to a type of seek operation, according to a seek direction, according to a track location, and according to a seek length.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for accessing data in a data storage device, comprising:
   (a) performing at least one data operation in the data storage device;
   (b) measuring an actual settle time for the data operation;
   (c) modifying a settle time estimation for the data storage device based on the actual settle time; and
   (d) scheduling one or more data operations within a queue in the data storage device based on the modified settle time estimation.

2. The method of claim 1, wherein the modifying step comprises adjusting the settle time estimation based on a success rate for the data operations.

3. The method of claim 2, wherein the success rate for the data operations comprises a comparison of the actual settle time versus the settle time estimation.

4. The method of claim 1, wherein the actual settle time is determined by timing the data operation.

5. The method of claim 4, wherein the timing step is performed by a servo controller in the data storage device.

6. The method of claim 1, wherein the modifying step comprises subtracting a first delta value from the settle time estimation when the settle time estimation is greater than the actual settle time.

7. The method of claim 1, wherein the modifying step comprises adding a second delta value to the settle time estimation when the settle time estimation is less than the actual settle time.

8. The method of claim 1, wherein the settle time estimation is selected from a group of settle time estimations comprising: settle time estimations for different transducers in the data storage device, settle time estimations according to a type of seek operation, settle time estimations according to a seek direction, settle time estimations according to a track location, and settle time estimations according to a seek length.

9. A data storage device, comprising:
   (a) one or more recording surfaces,
   (b) one or more transducers for writing data to the recording surfaces and for reading data from the recording surfaces, and
   (c) a controller for performing at least one data operation in the data storage device, for measuring an actual settle time for the data operation, for modifying a settle time estimation for the data storage device based on the actual settle time, and for scheduling one or more data operations within a queue in the data storage device based on the modified settle time estimation.

10. The data storage device of claim 9, wherein the controller adjusts the settle time estimation based on a success rate for the data operations.

11. The data storage device of claim 10, wherein the success rate for the data operations comprises a comparison of the actual settle time versus the settle time estimation.

12. The data storage device of claim 9, wherein the actual settle time is determined by timing the data operation.

13. The data storage device of claim 9, wherein the controller subtracts a first delta value from the settle time estimation when the settle time estimation is greater than the actual settle time.

14. The data storage device of claim 9, wherein the controller adds a second delta value to the settle time estimation when the settle time estimation is less than the actual settle time.

15. The data storage device of claim 9, wherein the settle time estimation is selected from a group of settle time estimations comprising: settle time estimations for different transducers in the data storage device, settle time estimations according to a type of seek operation, settle time estimations according to a seek direction, settle time estimations according to a track location, and settle time estimations according to a seek location.

16. An article of manufacture embodying logic for accessing data in a data storage device, comprising:
   (a) performing at least one data operation in the data storage device;
   (b) measuring am actual settle time for the data operation;
   (c) modifying a settle time estimation for the data storage device based on the actual settle time; and
   (d) scheduling one or more data operations within a queue in the data storage device based on the modified settle time estimation.

17. The logic of claim 16, wherein the modifying step comprises adjusting the settle time estimation based on a success rate for the data operations.

18. The logic of claim 17, wherein the success rate for the data operations comprises a comparison of the actual settle time versus the settle time estimation.

19. The logic of claim 16, wherein the actual settle time is determined by timing the data operation.

20. The logic of claim 19, wherein the timing step is performed by a servo controller in the data storage device.

21. The logic of claim 16, wherein the modifying step comprises subtracting a first delta value from the settle time estimation when the settle time estimation is greater than the actual settle time.

22. The logic of claim 16, wherein the modifying step comprises adding a second delta value to the settle time estimation when the settle time estimation is less than the actual settle time.

23. The logic of claim 16, wherein the settle time estimation is selected from a group of settle time estimations comprising: settle time estimations for different transducers in the data storage device, settle time estimations according to a type of seek operation, settle time estimations according to a seek direction, settle time estimations according to a track location, and settle time estimations according to a seek length.

* * * * *

UNITED STATES PATENT AND TRADEMARK OFFICE
CERTIFICATE OF CORRECTION

PATENT NO.   : 6,426,843 B1
DATED        : July 30, 2002
INVENTOR(S)  : Bernd Lamberts, Louis Joseph Serrano and Mantle Man-Hon Yu It is certified that error appears in the above-identified patent and that said Letters Patent is hereby corrected as shown below:

Column 8,
Line 35, "am" should read -- an --

Signed and Sealed this

Eighth Day of April, 2003

JAMES E. ROGAN
*Director of the United States Patent and Trademark Office*